US010800535B2

(12) United States Patent
 Fernandes et al.

(10) Patent No.: US 10,800,535 B2
(45) Date of Patent: Oct. 13, 2020

(54) INTEGRATED ENVIRONMENTAL CONTROL SYSTEMS AND METHODS FOR CONTROLLING ENVIRONMENTAL TEMPERATURE OF AN ENCLOSED SPACE

(71) Applicant: EMBRAER S.A., São José dos Campos (BR)

(72) Inventors: Júlio Romero Santos Fernandes, São José dos Campos (BR); Ricardo Gandolfi, São José dos Campos (BR); Nicolau Braga Santos, São José dos Campos (BR); Luiz Tobaldini Neto, São José dos Campos (BR)

(73) Assignee: EMBRAER S.A., São José dos Campos-SP (BR)

( * ) Notice: Subject to any disclaimer, the term of this patent is extended or adjusted under 35 U.S.C. 154(b) by 0 days.

(21) Appl. No.: 15/382,425

(22) Filed: Dec. 16, 2016

(65) Prior Publication Data
 US 2017/0096228 A1    Apr. 6, 2017

Related U.S. Application Data

(62) Division of application No. 13/720,605, filed on Dec. 19, 2012.

(60) Provisional application No. 61/581,378, filed on Dec. 29, 2011.

(51) Int. Cl.
| *B64D 13/08* | (2006.01) |
| *B64D 13/06* | (2006.01) |
| *F25B 6/02* | (2006.01) |
| *F25B 25/00* | (2006.01) |

(52) U.S. Cl.
 CPC ............. *B64D 13/08* (2013.01); *B64D 13/06* (2013.01); *F25B 6/02* (2013.01); *F25B 25/005* (2013.01); *B64D 2013/0614* (2013.01); *B64D 2013/0618* (2013.01); *B64D 2013/0629* (2013.01);
(Continued)

(58) Field of Classification Search
 CPC ..... B64D 2013/064; F25B 7/00; F25B 25/005
 See application file for complete search history.

(56) References Cited

U.S. PATENT DOCUMENTS

| 4,869,071 A | 9/1989 | Wehner et al. |
| 5,513,500 A | 5/1996 | Fischer et al. |
| 6,658,881 B1 | 12/2003 | Plattner |

(Continued)

OTHER PUBLICATIONS

Frick et al, "An Experimental Investigation of NACA Submerged-Duct Entrances", National Advisorvy Committee for Aeronautics, Nov. 13, 1945.*

(Continued)

*Primary Examiner* — Christopher R Zerphey
(74) *Attorney, Agent, or Firm* — Nixon & Vanderhye P.C.

(57) ABSTRACT

Environmental control systems and methods to control environmental temperature of an enclosed space by integrating a passive heat exchange subsystem (e.g., a loop heat pipe (LHP) heat exchange subsystem) having a closed loop heat exchange fluid circuit in heat-exchange relationship with the enclosed space for providing environmental temperature control therewithin, a RAM-air subsystem having a RAM-air circuit for circulating RAM cooling air, and a vapor compression cycle machine (VCM) subsystem having a VCM fluid circuit having a compressor, an evaporator, a condenser and an expansion valve.

5 Claims, 8 Drawing Sheets

(52) U.S. Cl.
CPC ............. *B64D 2013/0674* (2013.01); *F25B 2400/0403* (2013.01); *Y02T 50/56* (2013.01)

(56) References Cited

U.S. PATENT DOCUMENTS

| | | |
|---|---|---|
| 2004/0159119 A1 | 8/2004 | Hu |
| 2007/0095521 A1 | 5/2007 | Muhlthaler et al. |
| 2008/0314047 A1 | 12/2008 | Anderson et al. |
| 2009/0260387 A1 | 10/2009 | DeFrancesco et al. |
| 2009/0277993 A1 | 11/2009 | Storch |
| 2010/0071881 A1 | 3/2010 | Murer et al. |
| 2011/0186263 A1 | 8/2011 | Piesker |
| 2012/0160466 A1 | 6/2012 | Pollard et al. |
| 2013/0331019 A1 | 12/2013 | Piesker |

OTHER PUBLICATIONS

Frick et al, "*An Experimental Investigation of NACA Submerged-Duct Entrances*", National Advisory Committee for Aeronautics, Nov. 13, 1945.

\* cited by examiner

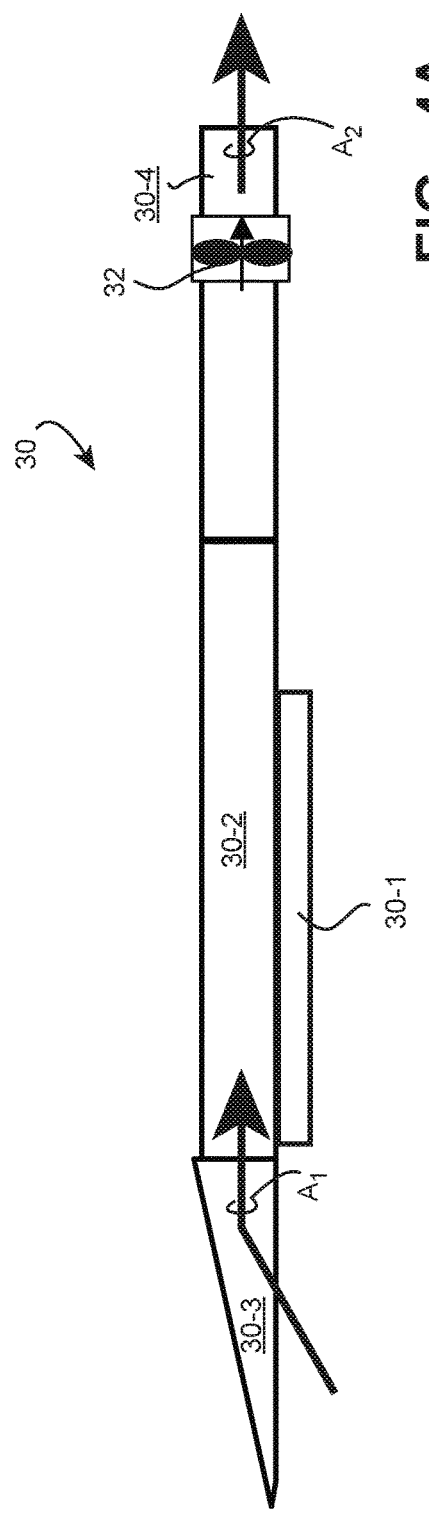
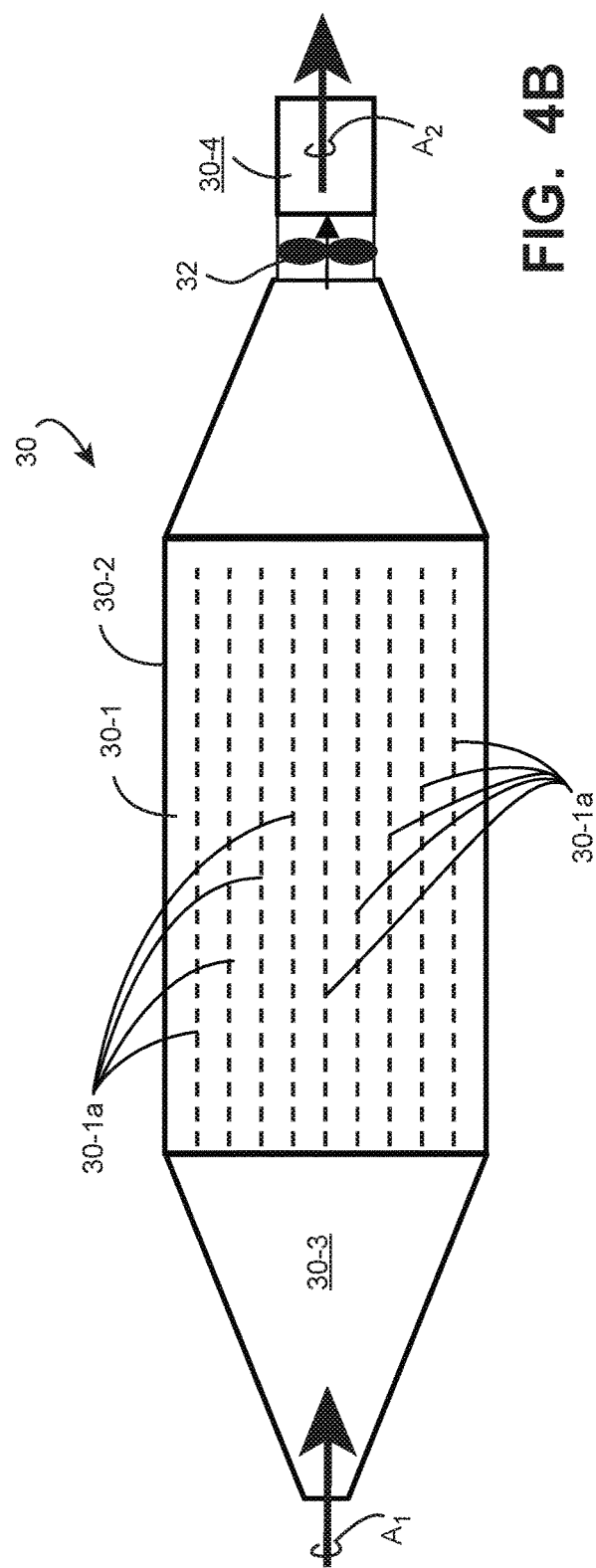

INTEGRATED ENVIRONMENTAL CONTROL SYSTEMS AND METHODS FOR CONTROLLING ENVIRONMENTAL TEMPERATURE OF AN ENCLOSED SPACE

CROSS-REFERENCE TO RELATED APPLICATION

This application is a divisional of U.S. application Ser. No. 13/720,605 filed on Dec. 19, 2012 (now abandoned), and is based on and claims domestic priority benefits under 35 USC § 119(e) from U.S. Provisional Application Ser. No. 61/581,378 filed on Dec. 29, 2011, the entire contents of each application being expressly incorporated hereinto by reference.

FIELD

The embodiments disclosed herein relate generally to the environmental control and thermal management (e.g., heating, cooling) of compartments/enclosures (e.g., within an aircraft fuselage) using an integrated architecture of environmental control systems, such as heat pipes, skin heat exchangers and/or vapor compression cycle systems. Embodiments of the methods and systems disclosed herein enable aircraft compartments/enclosures to be cooled with minimal aircraft power consumption (ultimately, minimal aircraft fuel consumption) demand during various phases of aircraft operation.

BACKGROUND

The concepts of future generation aircraft systems tend to demand an increase in electric power consumption. As a consequence, these systems will require the dissipation of more heat per volume. The increase in heat dissipation and the recent requirements to reduce aircraft fuel consumption conflict with one another and thus require the advent of more efficient cooling systems.

Currently, aircraft compartments/enclosures (electronic bays, galleys and the like) are provided with cooling systems that are commonly based on air cycle and/or vapor cycle systems and are not optimized in terms of the fuel penalty that such systems may extract on the overall aircraft performance. Thus, the higher the cooling requirement, the higher the cooling system power consumption and, as a consequence, the higher the aircraft fuel consumption. These cooling systems operate during all phases of the flight, including when the aircraft is on ground.

However, a dramatically large heat rejection potential exists when an aircraft is in flight due to the significant temperature difference between outside air (heat sink) and the specific compartments/enclosures/equipment being cooled. In order to develop more efficient cooling systems, there is a need to minimize the thermal resistance between the equipment and the heat sink.

Recently, a more efficient cooling system has been proposed by US Published Application No. 2004/0159119 (incorporated fully by reference herein) that mainly includes a liquid loop, a eutectic thermal battery and heat pump and skin heat exchanger (SHX). Similarly, US Published Application No. 2007/0095521 (incorporated fully by reference herein) mainly proposes the combination of loop heat pipe (LHP), cold storage unit and SHX.

There are several problems to be solved before greater fuel efficiencies can be fully realized. For example, current technologies lack a smart management of the available heat sinks for a compartment/enclosure cooling, causing more fuel consumption (fuel penalty over the aircraft performance) than is necessary, since the availability of heat sinks is not sufficiently used. For instance, sometimes a vapor compression cycle machine (VCM) needs to be used to cool electronic equipment inside the cabin, in spite of the cool air already available outside of the in-flight aircraft.

In addition, there currently is a lack of flexibility for use of the available heat sinks. By way of example, one electronic box cannot be installed in a predetermined compartment/enclosure because the outside air heat sink is located to far of a distance from that compartment/enclosure.

Furthermore, high thermal resistance between the compartment/enclosure (heat load) and the heat sink typically exists. This high thermal resistance requires active cooling systems (heat pumps) even when the temperature of the heat load is higher than the temperature of the heat sink. This effect happens most of the time during an aircraft mission. LHP's and other phase change passive heat transmission devices can be useful to diminish this thermal resistance.

It is therefore towards providing solutions to such problems that the embodiments of the present invention are directed.

SUMMARY

The disclosed embodiments herein are provided so as to achieve the goal of removing heat from a compartment/enclosure while minimizing the fuel penalty over the entire aircraft operation by using the features to be discussed in greater detail below. Additionally the heat removed from one compartment/enclosure may also be used as heat source for another compartment/enclosure. It may also be used for heating of an internal or external surface of the aircraft, as may be required for thermal management or ice and atmospheric protection. Generally, the embodiments as disclosed herein integrate various environmental control systems, such as heat pipes and skin heat exchangers, to minimize thermal resistance and reduce system power consumption.

According to some embodiments, a combination of multiple innovative environmental control components may be employed, for example (1) a loop heat pipe (LHP) condenser integrated with a vapor compression cycle machine (VCM) evaporator, in a single heat exchanger, and (2) a compact skin heat exchanger (SHX) embedded into a duct that is equipped with a ground cooling fan.

A system is also provided according to some embodiments for cooling a compartment/enclosure using a smart integration among different technologies for heat transport and heat sinks (VCM, SHX, LHP, RAM-air with ground cooling fan) and a proper operational logic, comprised of a hybrid system capable to operate with less power consumption over an entire aircraft mission, taking advantage from any one of the technologies being applied.

According to some embodiments, environmental control systems and methods are provided which control environmental temperature of an enclosed space by integrating a loop heat pipe (LHP) heat exchange subsystem having a closed loop heat exchange fluid circuit in heat-exchange relationship with the enclosed space for providing environmental temperature control therewithin, a RAM-air subsystem having a RAM-air circuit for circulating RAM cooling air, and a vapor compression cycle machine (VCM) subsystem having a VCM fluid circuit comprising a compressor, an evaporator and a condenser. The evaporator of the VCM subsystem may thus be integrated with the LHP heat exchange subsystem by being in operative heat-exchange relationship therewith, while the condenser of the VCM subsystem may be integrated with the RAM-air system so as to be in operative heat-exchange relationship therewith.

Some embodiments may include a LHP condenser of the LHP subsystem in operative heat-exchange relationship with the VCM evaporator of the VCM subsystem. The LHP heat exchange subsystem in other embodiments may also be provided with a LHP condenser skin heat exchanger (SHX), and a control valve for directing the working fluid to either the VCM evaporator or the LHP condenser SHX.

The RAM-air circuit of certain embodiments may include an air duct having an inlet and an inlet control door for controlling air flow into the duct, and a cooling fan for drawing air into the inlet and through the duct. Other embodiments may be provided with a RAM-air subsystem which comprises an embedded skin heat exchanger (SHX) in operative heat-exchange relationship with the air flow in the duct.

Certain other embodiments may be provided with a LHP heat exchange subsystem having a LHP condenser in operative heat-exchange relationship with the VCM evaporator of the VCM subsystem, and a LHP condenser skin heat exchanger (SHX). A control valve may thus be provided for directing the working heat exchange fluid to either the VCM evaporator of the VCM subsystem, the LHP condenser SHX of the LHP heat exchange subsystem or the embedded skin heat exchanger SHX of the RAM-air subsystem.

The VCM subsystem may include a VCM condenser skin heat exchanger (SHX) downstream of the VCM condenser. In certain embodiments, the VCM condenser SHX may be in operative heat-exchange relationship with an on-board fluid, such as on-board fuel and/or cabin air. Other embodiments may be provided with a VCM subsystem having a bypass valve to direct the VCM fluid circuit to or bypass the VCM fluid circuit around the VCM condenser SHX.

The heat released by skin heat exchangers may be used for heating an internal or external surface of the aircraft. For example, the heat released by a SHX can be used as sole or complementary ice and rain protection system for the external surface which it constitutes or is part of. Also, this heat can be used to heat door sills, galleys, among other aircraft regions.

These and other aspects and advantages of the present invention will become more clear after careful consideration is given to the following detailed description of the preferred exemplary embodiments thereof.

ACRONYMS

Structures and systems may sometimes be referenced herein by the following acronyms:
LHP-loop heat pipe
CPL-capillary pumped loop
LTS-loop thermosyphon
SHX-skin heat exchanger
VCM-vapor compression cycle machine
E-bay-electronic bay It will be understood that whenever LHP, CPL, LTS appear hereinbelow, all the possible variants for phase change heat dissipation devices are contemplated such as, for example, conventional heat pipes, thermosyphons, pulsating heat pipes, and the like. Therefore, reference to any specific acronym is non-limiting and merely employed for ease of discussion.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 4A and 4B are respective side and top views of a RAM-air duct embedded, finned SHX;

DETAILED DESCRIPTION

Many of the details, dimensions, angles and other features shown in the figures of the present patent application are merely illustrative of particular embodiments of the invention. Accordingly, other embodiments can have other details, dimensions, angles and features, without departing from the spirit or scope of the present inventions.

Several embodiments of innovative systems, as well as their logic of operation, are described hereinbelow as solutions to operate the aircraft with lower fuel consumption.

Figure 1:
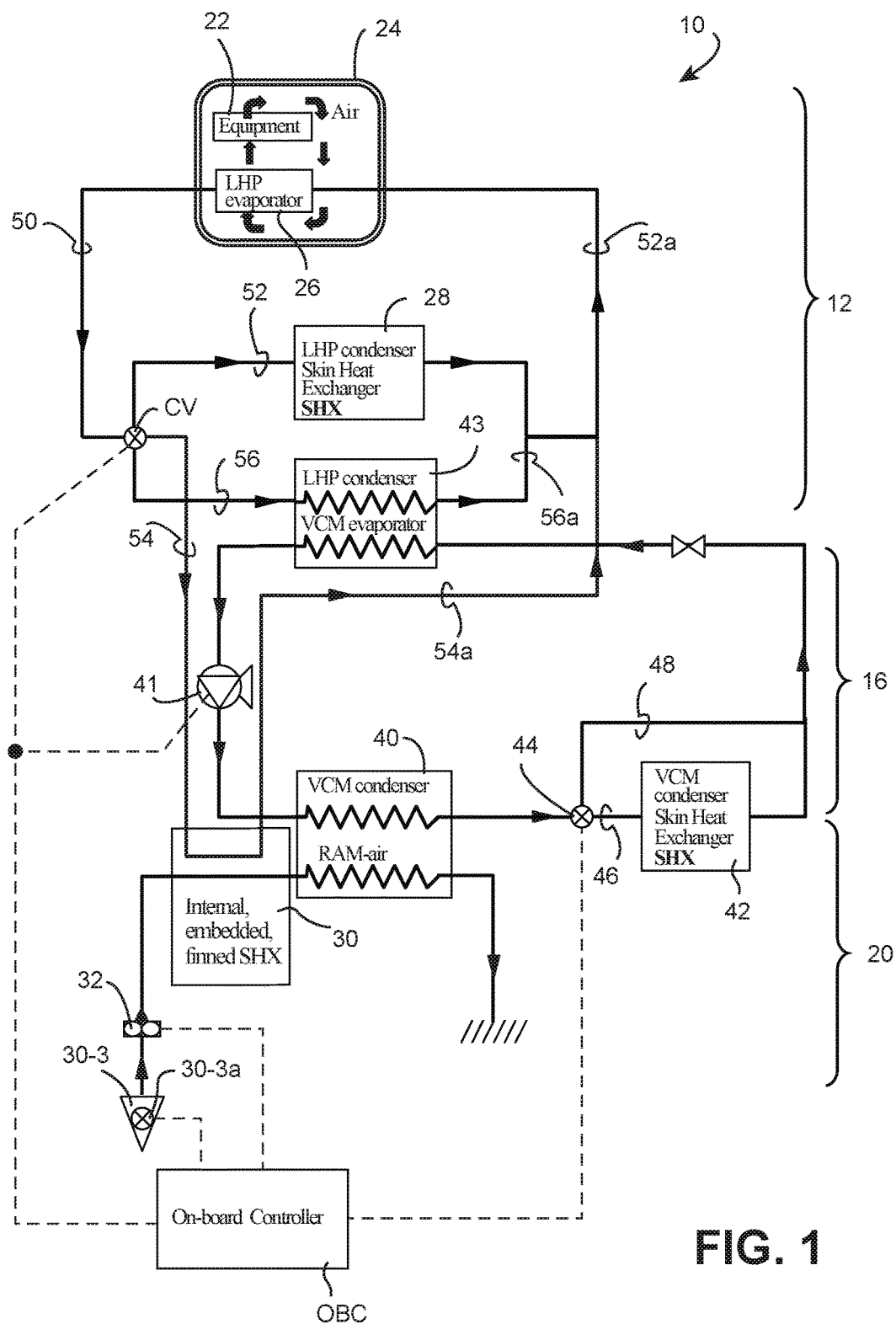
FIG. 1 is a schematic diagram of an embodiment of a system architecture for cooling a compartment/enclosure.

The architecture associated with one embodiment of an environmental control system 10 is shown schematically in FIG. 1. As is shown the architecture of the environmental control system 10 is comprised of multiple subsystems to dissipate the compartment/enclosure thermal load to the outside air (heat sink), namely the LHP subsystem 12 having an LHP evaporator 26 and a LHP condenser SHX 28 (see explanation of FIG. 2); the subsystem 14 having the internal embedded SHX 30 associated with the RAM-air circuit 20 (see explanation of FIG. 3 and FIGS. 4A-4B); the VCM subsystem 16 having a secondary VCM condenser SHX 42 (see explanation of FIG. 5); and the subsystem 18 having a primary VCM condenser 40 in the form of a conventional compact heat exchanger (see explanation of FIG. 6). The subsystems 14 and 18 depend on RAM air provided by the RAM-air circuit 20, whereas the LHP subsystem 12 is a passive system and the VCM subsystem 16 is an active system. As will be explained in greater detail below, an on-board controller OBC is provided with environmental inputs (e.g., outside air temperature, aircraft velocity and weight on wheels) so as to selectively operate one or more of the subsystems 12, 14, 16 and/or 18 in dependence upon the phase of aircraft operation (e.g., in flight or on ground) and/or the outside aircraft air temperature by selective positioning of the system control valve CV.

Figure 2:
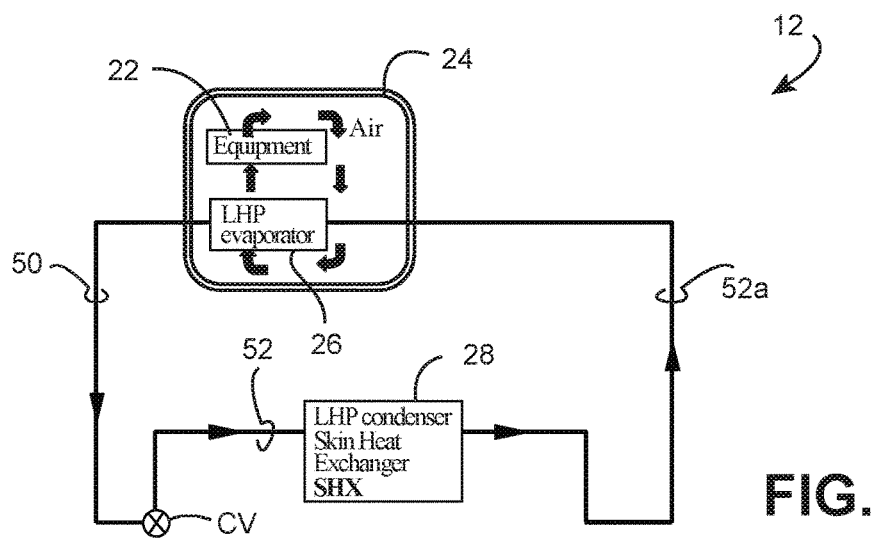
FIG. 2 is a schematic diagram of a LHP/CPL/LTS loop being used to cool the compartment/enclosure, with the SHX being used to cool the LHP condenser.

The LHP subsystem 12 is shown in greater detail in FIG. 2. As shown, the equipment 22 installed in the compartment/enclosure 24 dissipates its thermal load to an LHP evaporator 26, through air or other cooling medium circulating with in the compartment/enclosure 24 (e.g., via circulation fans (not shown)). The compartment/enclosure 24 (represented by the double line boundary around the equipment 22 and the LHP evaporator 26) may be an electronic compartment, galley compartment, baggage, live animal compartment or others. The compartment/enclosure 24 may also be only an electronic box properly equipped with a cold plate slot or surface, being the LHP evaporator part of such a cold plate. The control valve CV to select between one of the LHP condenser/VCM evaporator 43 or the LHP condenser/SHX 28 may or may not be necessary, since in some configurations there is a possibility that the LHP evaporator 26 can select passively the more suitable condenser 28 or 43 (i.e., the coldest condenser). This is the mode of operation for either high altitudes or during a cold-day on ground/low altitude operation. For these cold outside air operational conditions, the LHP condenser/SHX 28 is often enough to dissipate the equipment thermal load.

Figure 3:
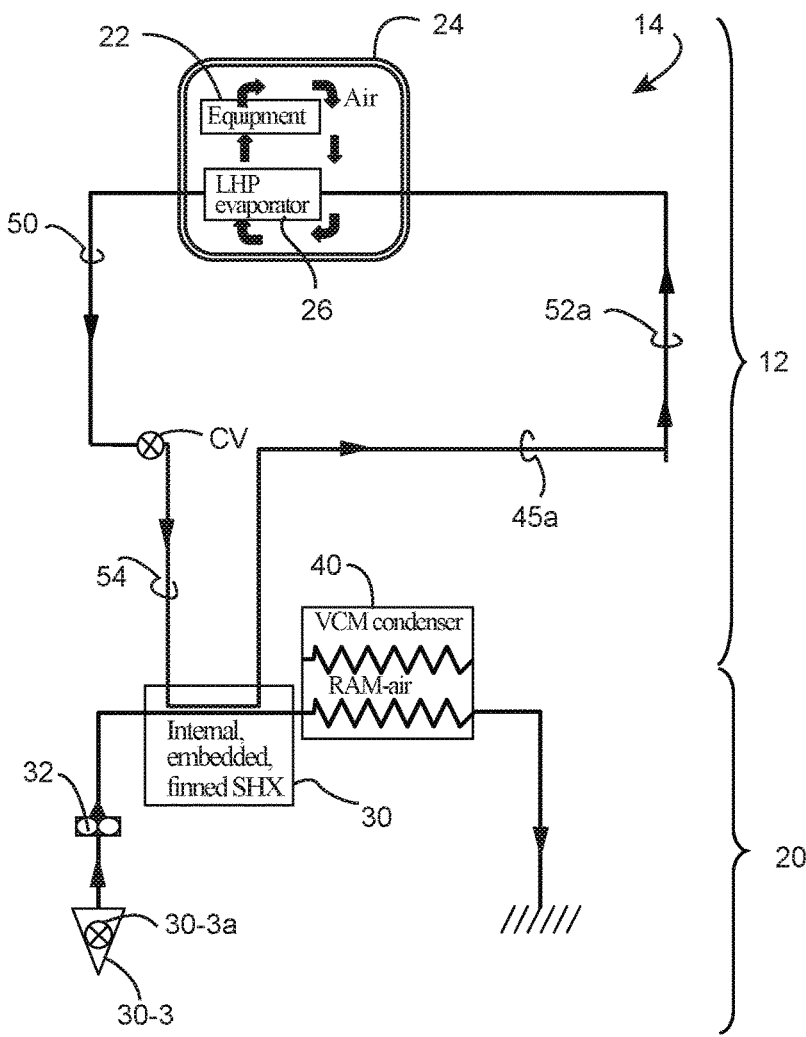
FIG. 3 is a schematic diagram of the operative interaction of the LHP subsystem and the RAM-air circuit having a RAM-air duct embedded finned skin heat exchanger which may be used to cool the LHP condenser.

The mode of operation for subsystem 14 depicted by FIG. 3 is advantageous when outside air is at sufficiently low temperatures, ranging from cold to standard temperature days. The heat removal from the embedded finned SHX 30 will thus function also on the ground by cooling fan 32 airflow inside the duct 30-2 (see FIG. 4) of the RAM-air circuit 20. Heat removal during this mode of operation (e.g., standard temperature days on ground) would otherwise require a VCM operation or the installation of a conventional compact heat exchanger into the RAM-air line. A VCM condenser 40 (see FIG. 5) could be inactive (i.e., VCM compressor 41 is turned off) or active in a lower capacity mode. The ground cooling fan 32 may be turned on, and the variable area NACA air inlet controlled door 30-3a may be fully open, based on outside air temperature, aircraft velocity and/or weight on wheels. The use of the embedded finned SHX 30 can be advantageous over a conventional compact heat exchanger because it is simpler, easier to install and maintain, and causes less pressure drop on the RAM-air circuit 20. At flight conditions, it is possible that the ground cooling fan 32 becomes a ram air flow restriction. When sufficient ram air pressure is available in-flight, the fan windmills. However, the RAM-air circuit 20 presents means to diminish the flow restriction of the ground cooling fan 32 at flight operation, not shown in FIGS. (e.g.: installation of a fan bypass check valve that opens at flight).

Accompanying FIGS. 4A and 4B depict side and top plan views, respectively, of a RAM-air duct embedded, finned SHX 30 that may be used in the subsystem 14 shown in FIG. 3. The finned SHX 30-1 is preferably installed on the RAM air duct wall 30-2, with the fins (a few of which are identified in FIG. 4B as reference numeral 30-1a) oriented facing the internal side of the duct wall 30-2 and oriented along the longitudinal direction thereof (i.e., in the same direction as the RAM air flow (arrow A1). The SHX 30-1 may act as a condenser for the LHP. Alternatively, the SHX 30-1 may be provided without fins if they are not deemed to be necessary. Ambient air, moved by the ground cooling fan 32, intakes through the NACA duct RAM-air intake 30-3, passes through the surface of the fins 30-1a (plain/strip/louvered fins or other variations) associated with the SHX 30-1 and is discharged (arrow A2) from the RAM-air line through the outlet 30-4 so as to be directed to the VCM condenser 40 associated with the subsystem 16.

Figure 5:
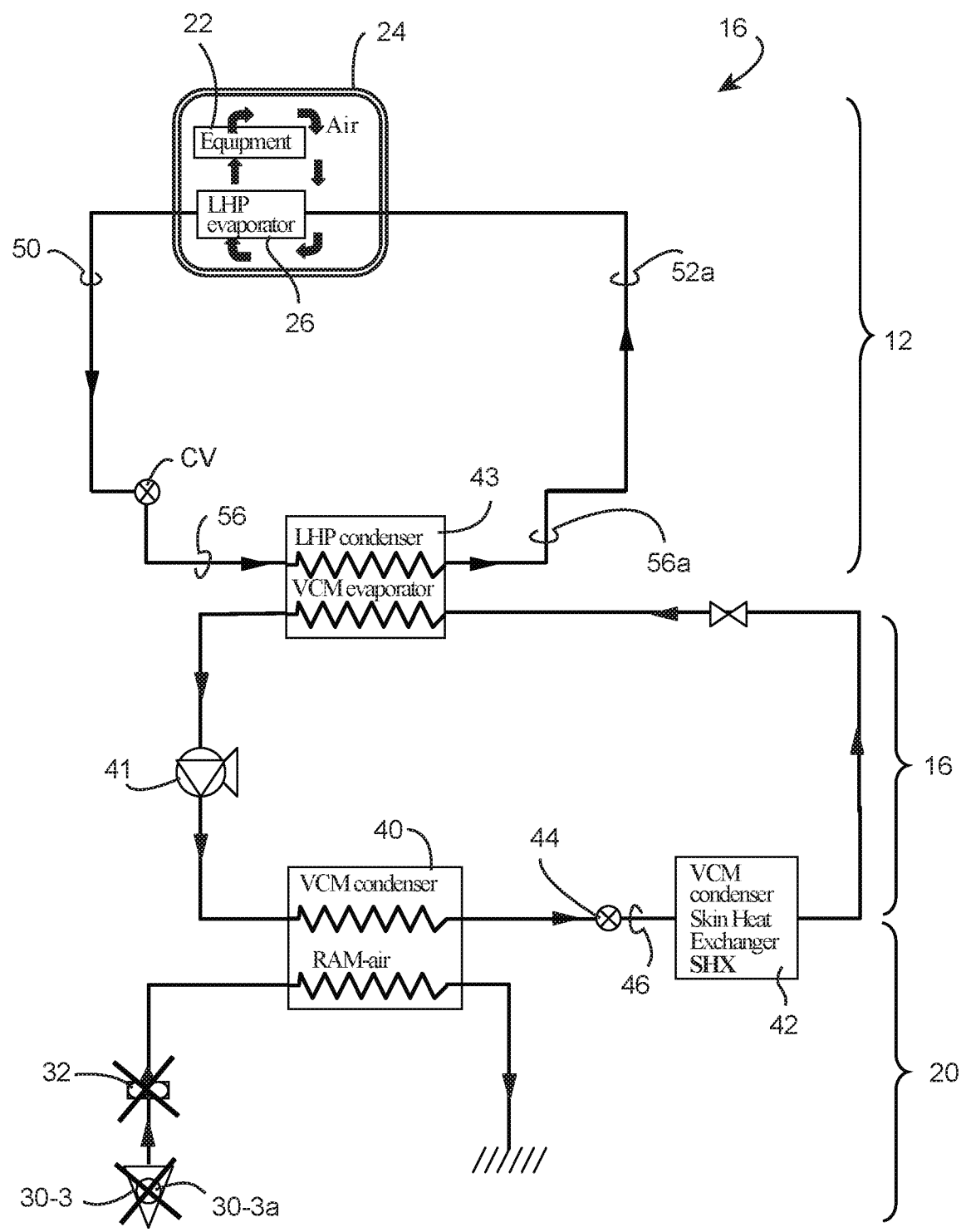
FIG. 5 is a schematic diagram of a VCM being used to cool the LHP condenser; SHX being used to cool the VCM condenser fluid (NACA air inlet closed)

Accompanying FIG. 5 shows an operational mode of subsystem 16 when outside air is not cold enough to operate the system 10 under the configurations described and shown by the subsystems 12 and 14 depicted in FIGS. 2 and 3. In the subsystem 16 of FIG. 5, however, the use of RAM-air to cool the primary VCM condenser 40 downstream of the VCM compressor 41 is not necessary, since the secondary VCM SHX condenser 42 of the VCM subsystem 16 would have sufficient airflow for heat removal by outside air convection. A two-way controlled valve 44 selects operation of the secondary VCM SHX condenser 42 of the VCM subsystem 16 via line 46 or selects a bypass line 48 (see also FIG. 1). As shown by the X's in FIG. 5, the ground cooling fan 32 is turned off, and the NACA inlet controlled door 30-3a, is fully closed in response to a signal output of control logic based on outside air temperature, aircraft velocity and weight on wheels issued by the on-board controller OBC (see FIG. 1). No drag due to RAM-air is thus imposed on the aircraft in such a configuration since the NACA inlet door 30-3a, is fully closed. The VCM subsystem 16 needs to be operated, because the temperature difference between the equipment and the outside air (the heat sink) is low or even negative (equipment desired temperature is lower than heat sink outside air temperature). The secondary VCM SHX condenser 42 of the VCM subsystem 16 dissipates both the thermal load from the equipment (e.g., the LCP condenser/VCM evaporator 43) and the energy put into the system by the primary VCM compressor 41. For this reason the skin temperature of the SHX associated with the secondary VCM SHX condenser 42 is higher than the temperature of the SHX 28 as described in FIG. 2. As such, the SHX associated with the secondary condenser 42 requires less surface area than the SHX associated with the LHP condenser 28. The cooled working fluid may then be returned to the LHP evaporator 26 via lines 56a and 52a.

Figure 6:
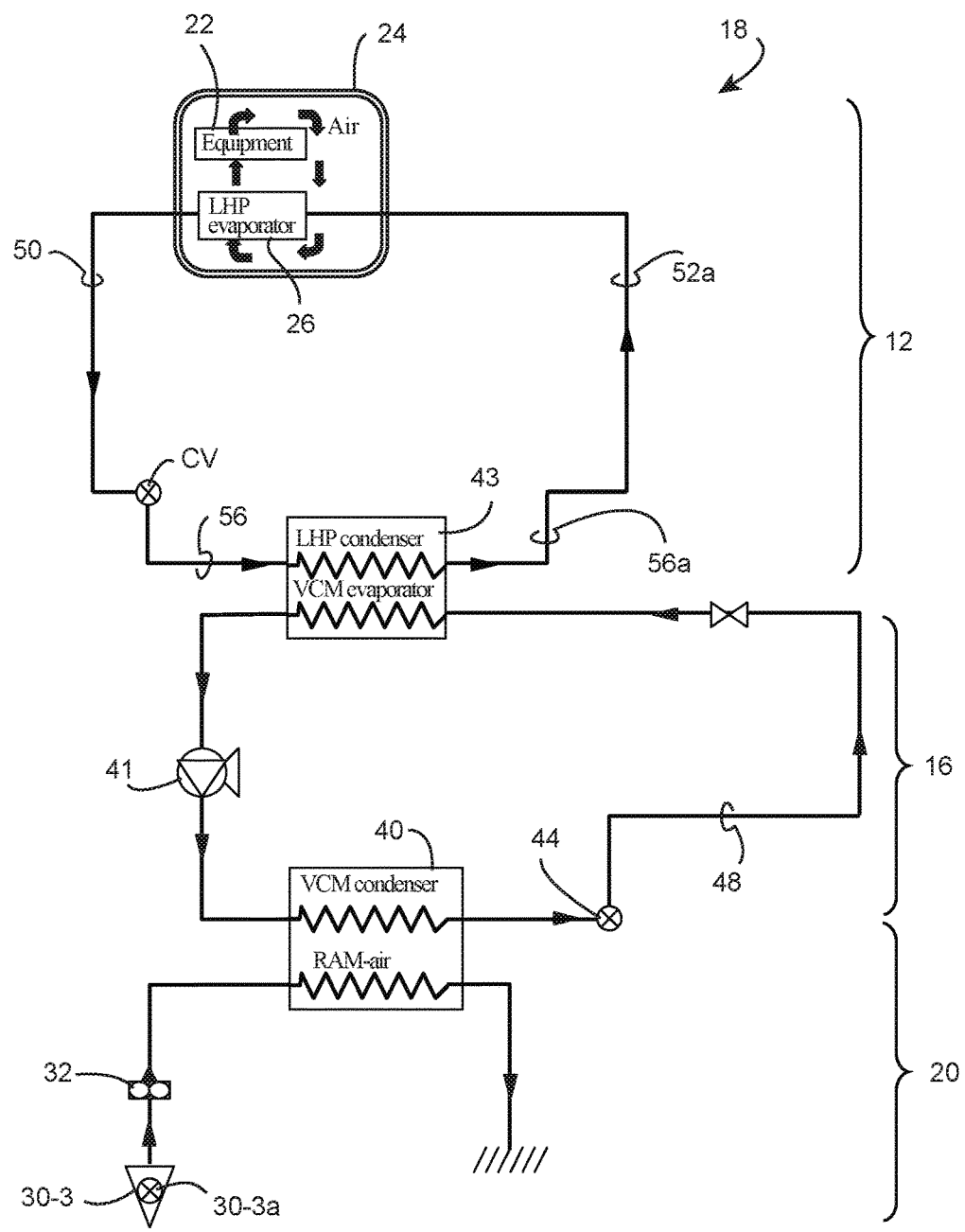
FIG. 6 is a schematic diagram of a VCM being used to cool the LHP condenser; NACA/RAM-air being used to cool the VCM condenser fluid (NACA air inlet shut off) with a ground cooling fan static operation.

Accompanying FIG. 6 depicts an operational mode for the hottest days, on ground or flying at low altitudes in relatively warm outside air. The VCM subsystem 16 needs to be turned on using either the RAM-air circuit 20, for in-flight conditions, or the ground cooling fan 32, for on ground operation. In such a condition, the two-way valve 44 is commanded by the on-board controller OCB to bypass the SHX condenser 42 of the VCM subsystem (i.e., via line 48 as shown also FIG. 1). The ground cooling fan 32 may then be turned on, and the control door 30-3a, of the NACA inlet 30-3 may be fully opened, based on outside air temperature, aircraft velocity and weight on wheels as commanded by the on-board controller OCB.

The heat removed from the compartment/enclosure, by air or other cooling medium, or even using a cold plate or similar device, is drawn through the LHP evaporator 26. Inside the LHP 26, the working fluid is evaporated, by absorbing the heat from the equipment. The vaporized working fluid then flows towards the system control valve CV via line 50. The on-board controller OCB can thus command the control valve CV to assume one of three different conditions so that the vaporized working fluid can then be directed in the following respective three different routes:

1. For cold days, on ground or in-flight (see explanation of FIG. 2), the vaporized working fluid is directed to the LHP condenser SHX 28 via line 52 so that the heat may be dissipated to the outside cold air by convection. The cooled working fluid is then returned to the LHP evaporator 26 via line 52a. This SHX 28 can be either an outside face plain SHX or a finned SHX as shown in FIGS. 4A and 4B. This configuration does not consume any energy to operate (except energy for air movement inside the compartment/enclosure 24, that would always be present), since the LHP condenser is a passive device.

2. If operating when outside air is at sufficiently low temperatures (ranging from cold to standard days), on ground, another configuration needs to be used, since the lack of induced airflow over the LHP condenser SHX 28 will not allow it to be used. In this case the configuration described above in relation to FIG. 3 is used. For this purpose, the control valve CV drives the LHP working fluid in line 50 towards the RAM-air duct embedded finned SHX 30 via line 54. The cooled working fluid is then returned to the LHP evaporator 26 via line 54a and 52a. The heat removal from this embedded finned SHX 30 depends upon the airflow provided by the ground cooling fan 32 inside the RAM-air duct 32 (see FIGS. 4A and 4B). During this mode of operation the VCM compressor 41 is turned off by the controller OBC. The controller OBC also turns the ground cooling fan 32 on, and fully opens the control door 30-3a, associated with the variable area NACA air inlet 30-3, based on outside air temperature, aircraft velocity and weight on wheels. The energy consumption during this mode of operation is therefore attributed only to the operation of the ground cooling fan 32.

3. The control valve CV may be commanded to direct the LHP working fluid in line 50 towards the LHP condenser/VCM evaporator 43 via line 56 under the following conditions:
    a. For hot days, with aircraft flying at low altitudes, the outside air may not be cold enough to operate the system 10 under the configurations of the subsystems 12 and 14 as described in relation to FIGS. 2 and 3, respectively. As a result, the VCM subsystem 16 is then required to be operated because the temperature difference between the equipment 22 within the enclosure 24 and the outside air (the heat sink) is low or even negative (e.g., equipment desired temperature lower than the available heat sink outside air temperature). However, the use of RAM-air to cool the VCM condenser 40 is not necessary, since the SHX condenser 42 of the VCM subsystem 16 would have sufficient heat removal capacity provided by external air convection (see FIG. 5). The on-board controller OBC thus turns off the ground cooling fan 32, and fully closes the inlet control door 30-3a, of the NACA inlet 30-3 following a control logic based on outside air temperature, aircraft velocity and weight on wheels; or
    b. For the hottest days, the outside air is not cold enough for the heat to be dissipated through the SHX condenser 42 of the VCM subsystem 16 for on ground aircraft operation, and for in-flight operation at low altitudes (e.g., with warm outside air temperatures). Under such conditions, the on-board controller OCB operates the control valve 44 so as to bypass the SHX condenser 42 of the VCM subsystem 16 and the VCM condenser 40 uses either RAM-air, for in-flight operation via the RAM-air subsystem 20, or the ground cooling fan 32 of the RAM-air subsystem 20, for on ground operation. For on ground operation the ground cooling fan 32 is turned on, and the NACA inlet controlled door 30-3a, is fully open. For in-flight operation, the ground cooling fan 32 is turned off and the NACA inlet 30-3 and its associated RAM-air provides outside air to cool the VCM condenser 40.

Table 1 below presents a summary of the operational modes discussed above.

TABLE 1

Predicted modes of operation as a function of: ambient temperature, on ground versus in-flight operation and high altitude versus low altitude

| | | Flight | |
|---|---|---|---|
| | Ground | Low altitude | High altitude |
| Cold day | LHP using SHX as a condenser; zero consumption (FIG. 2) | LHP using SHX as a condenser; zero consumption (FIG. 2) | LHP using SHX as a condenser; zero consumption (FIG. 2) |
| Standard day | LHP using internally embedded SHX into a duct, cooled by a ground cooling fan; consumption of a ground cooling fan (FIG. 3) | LHP using internally embedded SHX into a duct, cooled by a ground cooling fan; consumption of a ground cooling fan (FIG. 3) | |
| Hot day | LHP using VCM, with VCM condenser being cooled by the ground cooling fan; consumption of both the VCM compressor and ground cooling fan (FIG. 6) | LHP using VCM, with VCM condenser being cooled by the SHX condenser of the VCM; consumption of the VCM compressor (FIG. 5) | |
| Very hot day | | LHP using VCM, with VCM condenser being cooled by NACA/RAM-air; consumption of the VCM compressor (FIG. 6) | |

Figure 7:
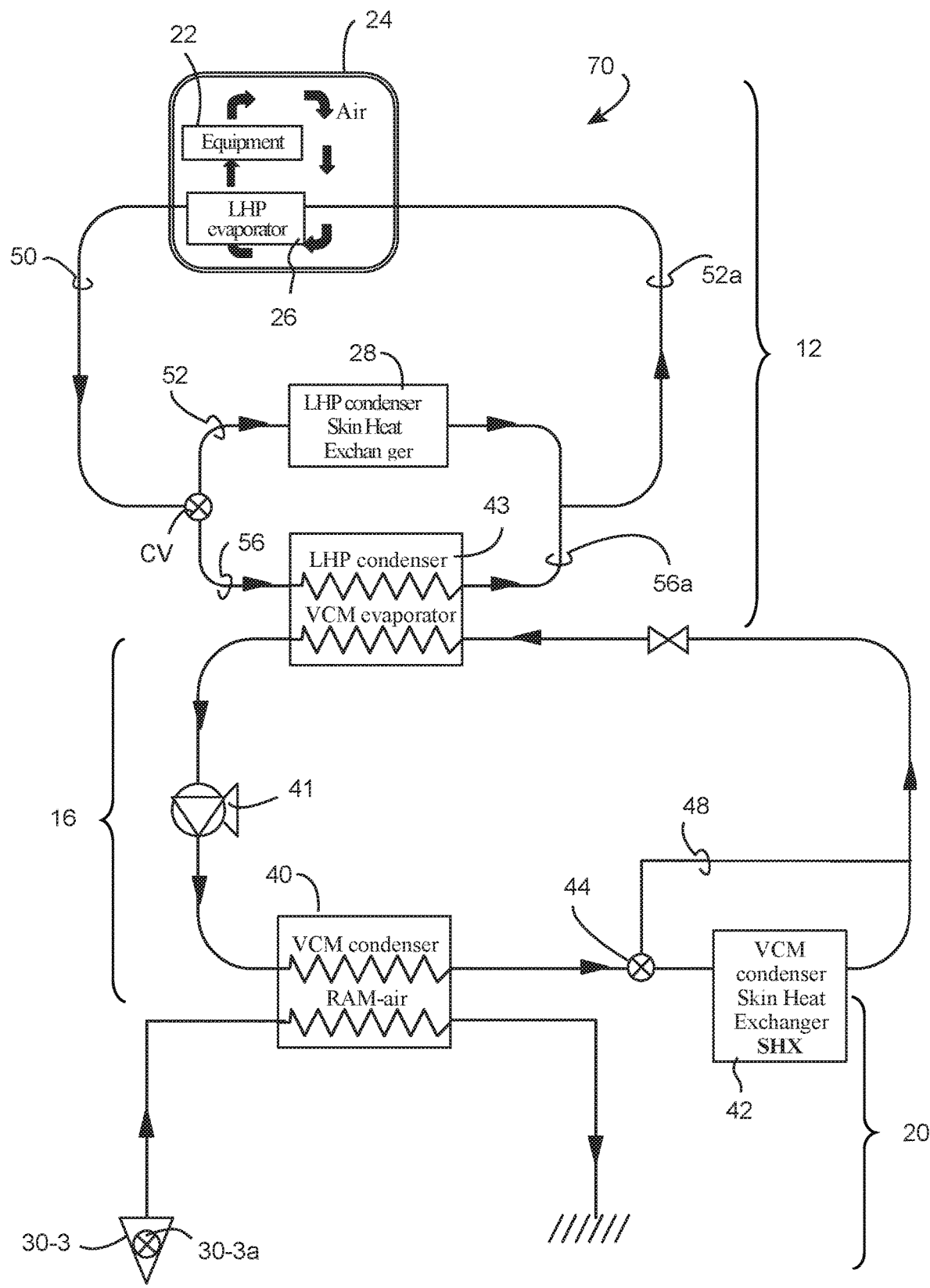
FIG. 7 is a schematic diagram of a system embodiment without the SHX being embedded into the RAM-air duct.

Other embodiments based on the system architectures described above are shown by FIGS. 7, 8 and 9. As shown in FIG. 7, for example, the system 70 is similar to the system 10 described previously in connection with FIG. 1, but omits the line 54, the internal embedded finned SHX 30 and cooling fan 32 associated with the RAM-air circuit 20. Thus, in the embodiment of FIG. 7, the control valve CV is provided so as to direct the working fluid in line 50 to either the LHP condenser 43 or the LHP condenser SHX 28.

Figure 8:
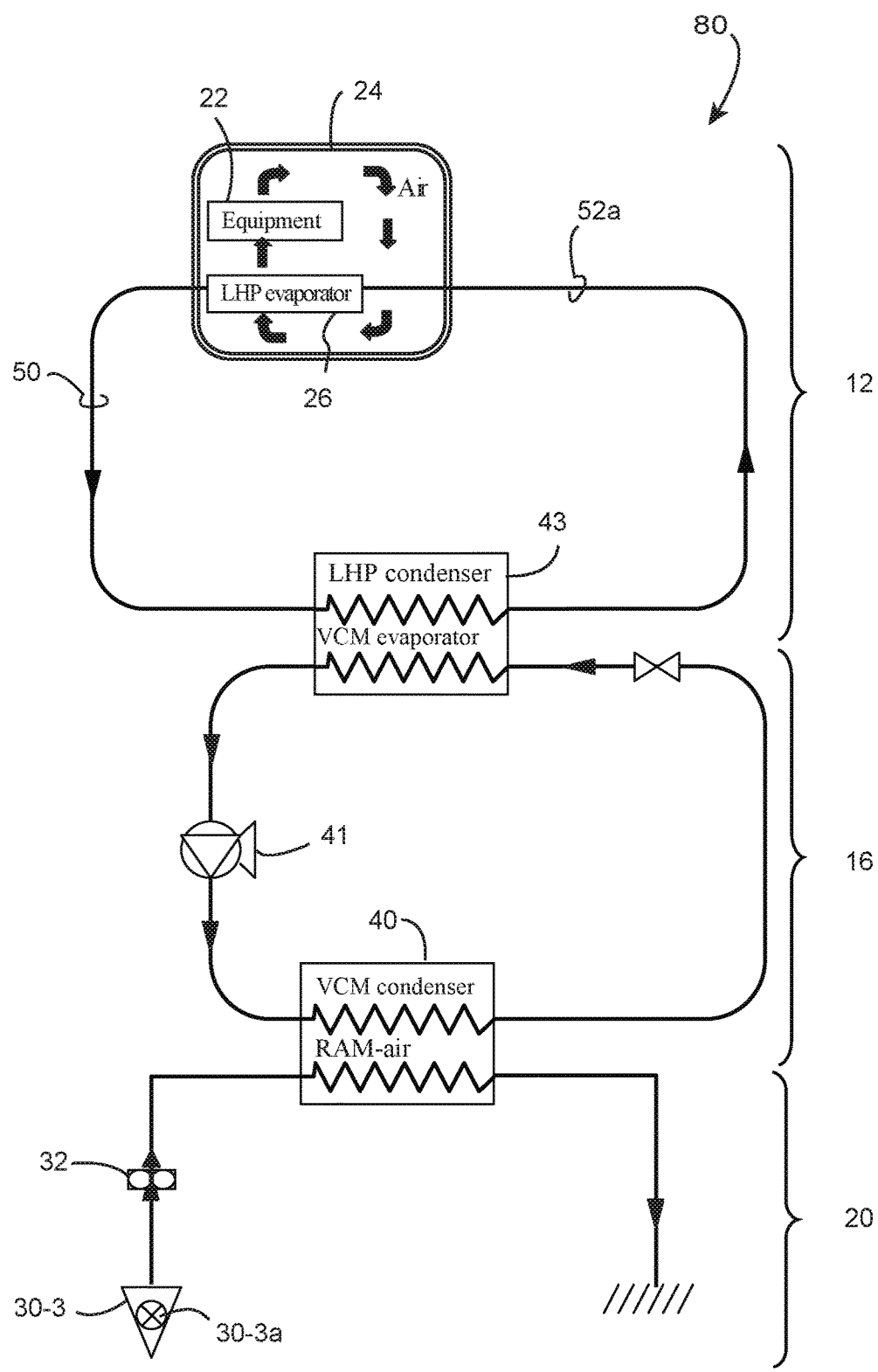
FIG. 8 is a schematic diagram of a system embodiment without both the SHX for the LHP condenser and the SHX for the VCM condenser.

The system 80 shown in FIG. 8 is similar to the embodiment shown in FIG. 7 but omits the LHP condenser SHX 28 and the VCM condenser SHX 42. As such, the control valve CV and the bypass valve 44 are unneeded in the FIG. 8 embodiment.

Figure 9:
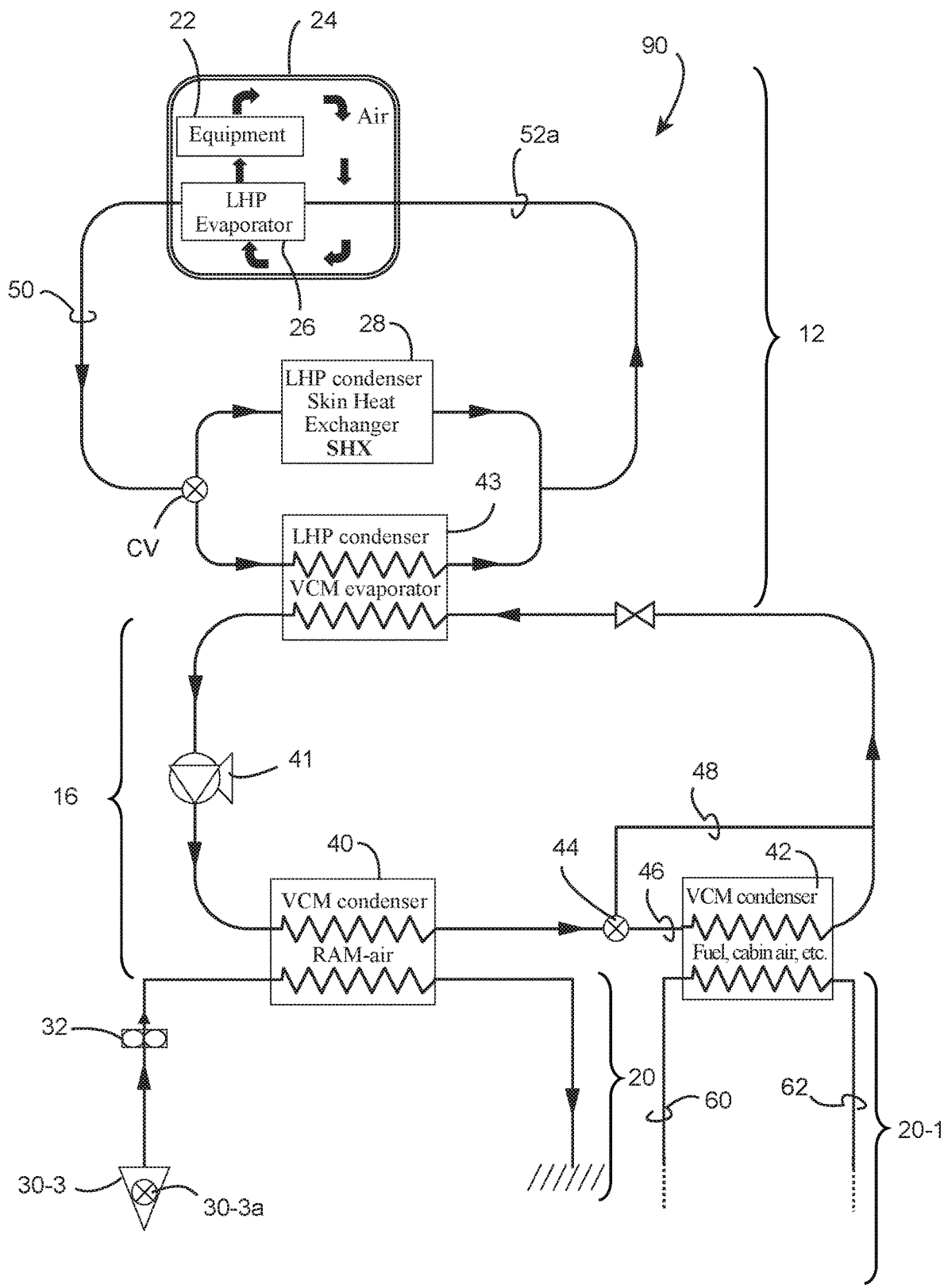
FIG. 9 is a schematic diagram of a system embodiment with a VCM condenser being cooled by other means, such as on board fuel or ambient cabin air.

The system 90 shown in FIG. 9 is similar to the system depicted in FIG. 1, but omits the subsystem 14 as described above in relation to FIG. 3. That is, the system 90 of FIG. 9 does not include the internal embedded finned SHX 30 or the line 54. Consequently the control valve CV in the system 90 need only direct the working heat-exchange fluid in the LHP subsystem 12 to either the LHP condenser 43 or the LHP condenser SHX 28. The VCM subsystem of system 90 includes a VCM condenser heat exchanger that operates in heat-exchange relationship with an on-board fluid subsystem 20-1 (such as on-board fuel and/or cabin air) downstream of a VCM condenser 40 that operates in heat-exchange relationship with the ram air circuit 20. A two-way controlled valve 44 selects operation of the VCM condenser 42 via line 46 (see FIG. 9) or selects a bypass line 48 (see also FIG. 9).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An aircraft which comprises an environmental control system for controlling environmental temperature of an enclosed space of the aircraft, wherein the environmental control systems comprises:
   a passive phase change heat exchange subsystem having a closed loop heat pipe (LHP) circuit for circulating a heat exchange fluid and a LHP evaporator for receiving the heat exchange fluid in heat-exchange relationship with the enclosed space for providing environmental temperature control therewithin;
   a RAM-air subsystem which includes an air duct defined by duct walls having an inlet comprised of a NACA duct RAM-air intake and an outlet to allow ambient air to flow into and out of the air duct and to thereby define an air circuit for circulation of cooling air between the inlet and outlet, and an internal embedded skin heat exchanger (SHX) which is operatively affixed to the air duct to receive RAM-air, the internal embedded SHX comprising a plurality of fins oriented so as to face an internal side of a duct wall of the air duct; and
   a vapor closed loop compression cycle machine (VCM) subsystem having a VCM fluid circuit comprising a VCM compressor, a primary VCM condenser in heat exchange relationship with the air circuit of the RAM-air subsystem, a secondary VCM condenser in the VCM fluid circuit positioned upstream or downstream of the primary VCM condenser, a VCM bypass line to bypass the secondary VCM condenser, a VCM expansion valve, a VCM evaporator and a VCM condenser bypass valve to selectively establish fluid communication between the primary VCM condenser and either the secondary VCM condenser or the VCM bypass line, wherein
   the LHP circuit comprises:
   (i) a first branch which includes a primary LHP condenser so as to receive the heat exchange fluid from the LHP evaporator and direct the heat exchange fluid into heat exchange relationship with the VCM evaporator of the VCM subsystem,
   (ii) a second branch which includes a LHP SHX condenser for receiving the heat exchange fluid from the LHP evaporator,
   (iii) a third branch which directs the heat exchange fluid from the LHP evaporator to the internal embedded SHX operatively affixed to the air duct to cool the heat exchange fluid in the RAM-air subsystem and direct cooled heat exchange fluid back to the LHP evaporator, and
   (iv) a LHP control valve for directing the LHP circuit heat exchange fluid between one of the first, second and third branches thereof, and wherein
   the system further comprises an on-board controller operatively connected to the VCM condenser bypass valve for operatively selecting fluid communication between either the secondary VCM condenser or the VCM bypass line, and the LHP control valve for operatively selecting heat exchange fluid flow through either the LHP SHX condenser or the LHP condenser into heat exchange relationship with the VCM evaporator or the SHX affixed to the air duct in the RAM-air subsystem, wherein during in-flight operation, the on-board controller is configured to:
   (i) operatively activate the LHP control valve at an altitude of the aircraft having a temperature below standard to allow heat exchange fluid to flow only through the LHP SHX condenser in the absence of on-board power consumption by the system, or
   (ii) operatively activate the LHP control valve at an altitude of the aircraft having a temperature above standard to allow heat exchange fluid to flow only through the LHP condenser with the VCM compressor being the only on-board power consumption by the system.

2. The aircraft according to claim 1, wherein the air circuit of the RAM-air subsystem includes an inlet control door for controlling air flow into the inlet of the duct, and a cooling fan for drawing air into the inlet and through the duct.

3. The aircraft according to claim 1, wherein the secondary VCM condenser is a compact heat exchanger in operative heat-sink relationship with at least one on-board fluid selected from the group consisting of on-board fuel and cabin air.

4. The aircraft according to claim 3, wherein the on-board fluid with which the secondary VCM condenser is in operative heat exchange relationship is on-board fuel.

5. The aircraft according to claim 3, wherein the on-board fluid with which the secondary VCM condenser is in operative heat exchange relationship is aircraft cabin air.

* * * * *